April 3, 1928.
J. W. HANNAN
1,664,557
AIR PUMP STROKE AND PRESSURE INDICATOR
Filed Dec. 16, 1926  3 Sheets-Sheet 1
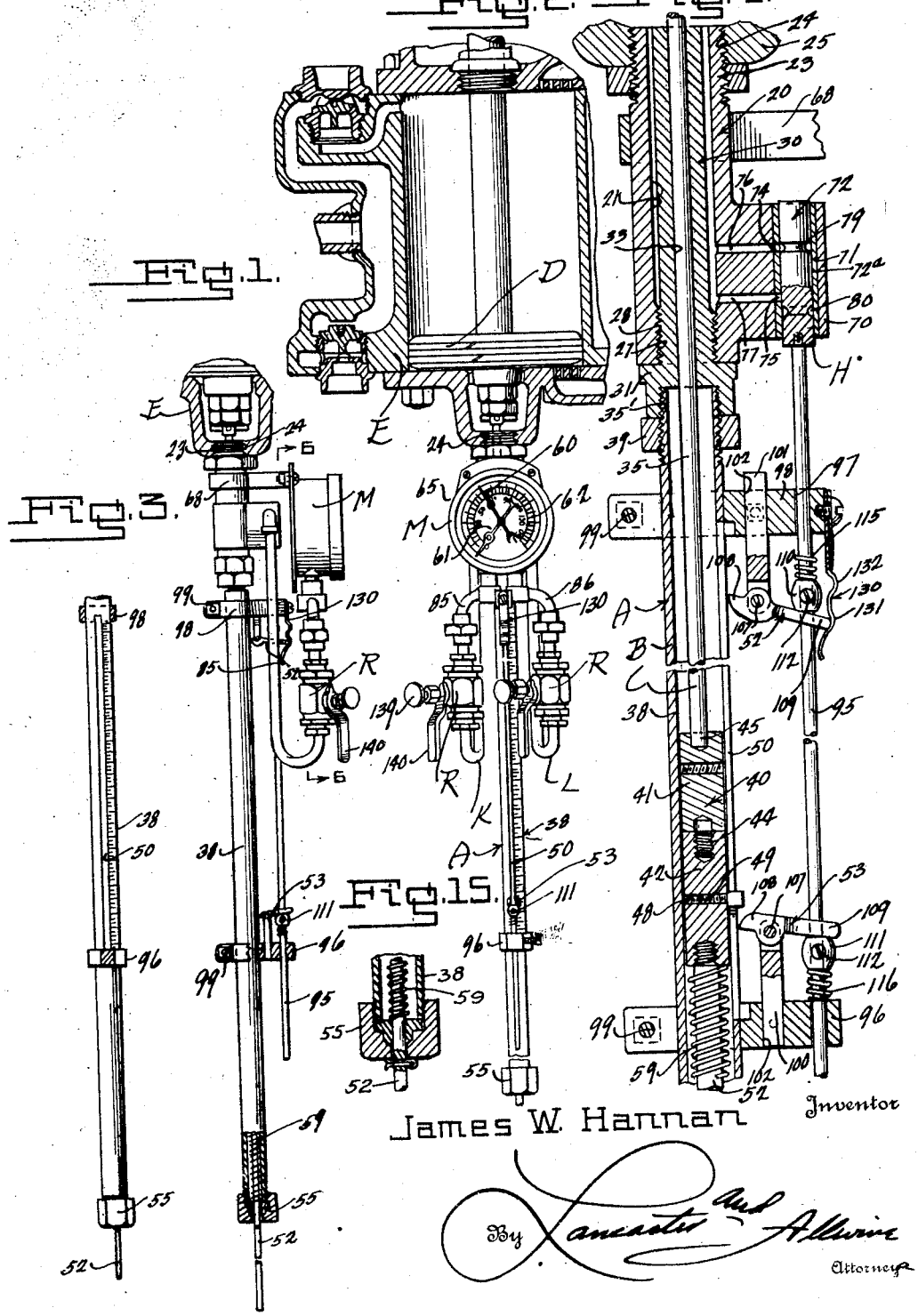
James W. Hannan, Inventor
By Lancaster and Allwine, Attorneys

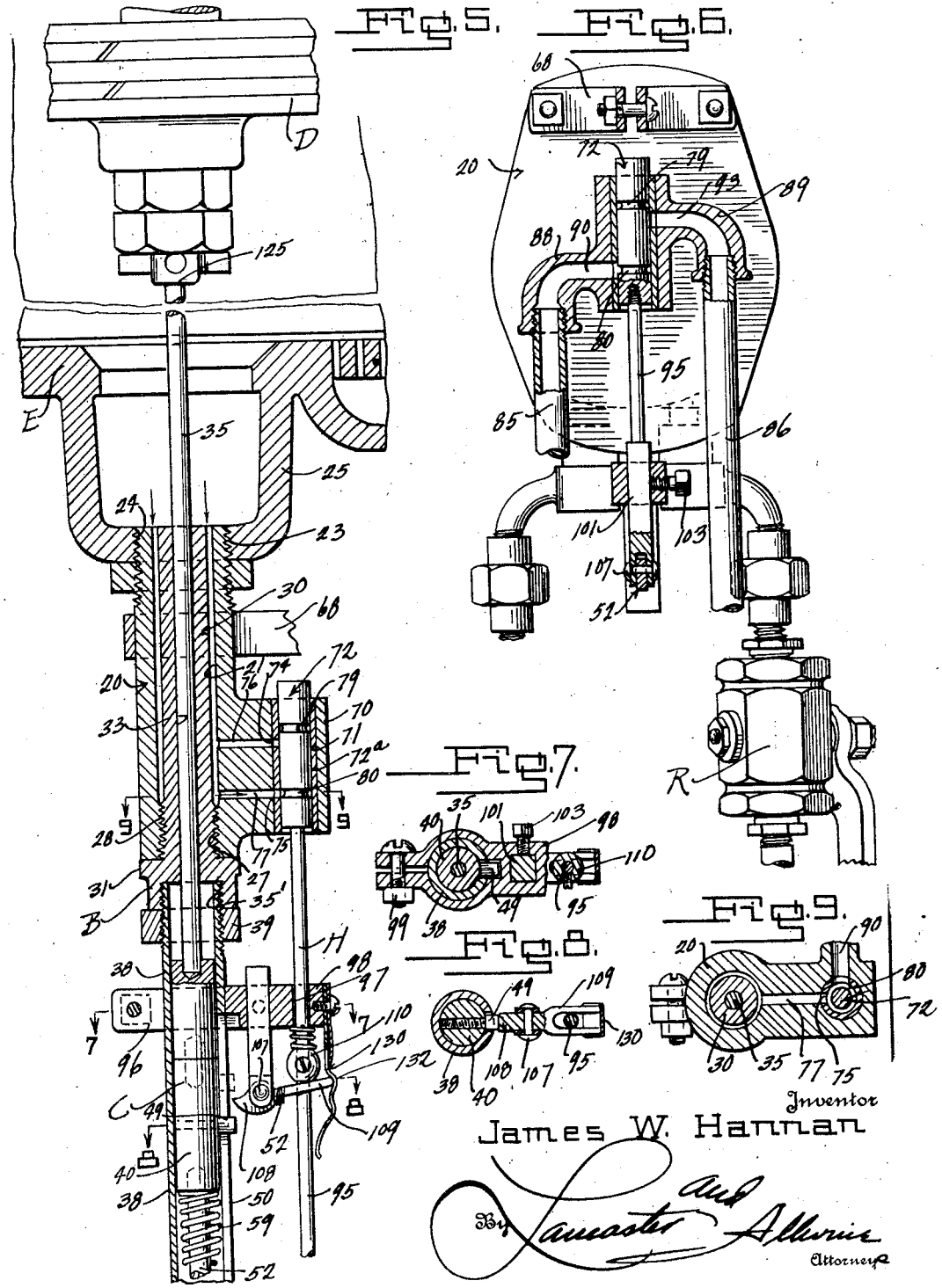

April 3, 1928.  J. W. HANNAN  1,664,557
AIR PUMP STROKE AND PRESSURE INDICATOR
Filed Dec. 16, 1926   3 Sheets-Sheet 3
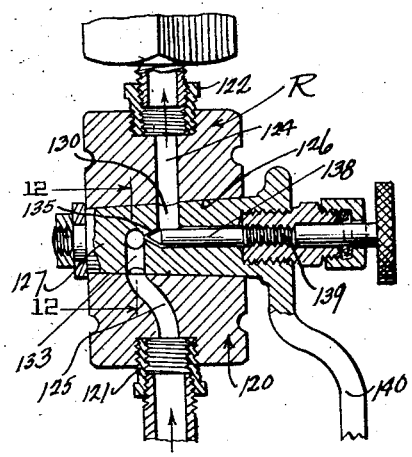
Fig. 10.
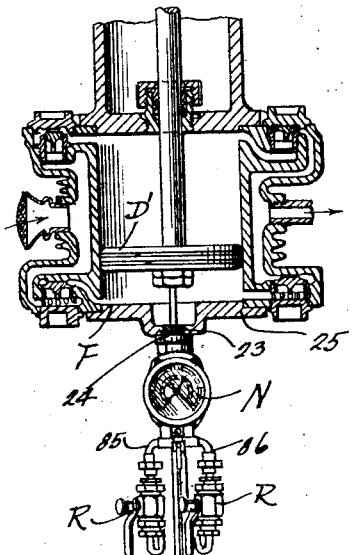
Fig. 13.
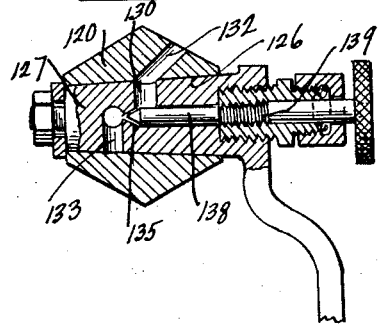
Fig. 11.
Fig. 12.
Fig. 14.
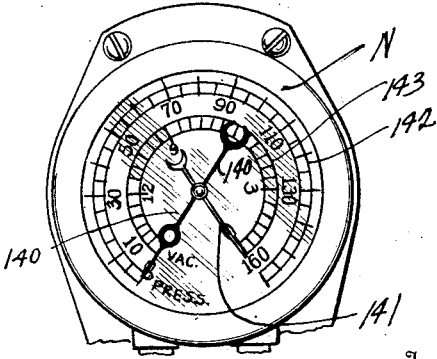
James W. Hannan, Inventor Patented Apr. 3, 1928.

1,664,557

UNITED STATES PATENT OFFICE.

JAMES W. HANNAN, OF COFFEYVILLE, KANSAS.

AIR-PUMP STROKE AND PRESSURE INDICATOR.

Application filed December 16, 1926. Serial No. 155,316.

This invention relates to improvements for testing the efficiency within cylinders wherein pistons operate, whether the pressure be superatmospheric or subatmospheric.

The primary object of the invention is the provision of apparatus for testing the efficiency of air pumps and the like; being especially adaptable for use in testing the efficiency of locomotive compound or single stage compressors, in order to determine specific faults in the operation thereof, such as leaky packing rings; leaky valves; clogged air passages; clogged strainers; pressure inefficiency; and too short piston stroke.

Other objects and advantages of this invention will be apparent during the course of the following detailed description.

In the accompanying drawings, wherein for the purpose of illustration are shown preferred and modified embodiments of the invention.

Figure 1 is a side elevation of the improved device for testing the efficiency of locomotive air pumps.

Figure 2 is a front elevation of the improved device, showing the same applied to the high pressure cylinder of a cross compound air compressor, for testing the general efficiency of operation of the high pressure air cylinder; the improved device when used in this connection having a gauge associated therewith for determining superatmospheric pressures existing in the cylinder of each limit of stroke of the piston therein.

Figure 3 is a front elevation of the tubular casing of the improved device.

Figure 4 is a fragmentary vertical sectional view taken through details of construction of the improved device.

Figure 5 is a fragmentary sectional view taken through the upper end of the improved device, as mounted in the lower end of an air cylinder, showing its relative co-operation of parts and its association with the piston.

Figure 6 is a fragmentary sectional view taken substantially on the line 6—6 of Figure 1.

Figures 7, 8 and 9 are sectional views taken substantially on their respective lines in Figure 5 of the drawings.

Figure 10 is a sectional view taken through the retarder which is associated with the gauge portion of the improved device for buffing the air action of the indicators of the gauge, to prevent damage thereto.

Figure 11 is a sectional view taken through the valve illustrated in Figure 10, in a differently adjusted position for venting air to the atmosphere from the cylinder, to aid in the blowing out of air passages and the like.

Figure 12 is a transverse sectional view taken substantially on the line 12—12 of Figure 10.

Figure 13 is a front elevation of the improved device, showing the same as applied to the low air pressure cylinder side of a cross compound air compressor, or as used in connection with a single stage air compressor, and in this instance the type of gauge is different than the gauge used in the illustration of Figure 2, since it will have to register superatmospheric pressure and subatmospheric pressure or vacuum.

Figure 14 is a front elevation of the dial and indicators of the type of gauge illustrated in use in Figure 13.

Figure 15 is a fragmentary sectional view of a detail of the invention used during the assemblage of the device to the cylinder.

In the drawings, wherein similar reference characters designate corresponding parts throughout the several views, the letter A may generally designate the improved device which is preferably used for testing the general efficiency of air cylinders of locomotive air pumps to determine lack of efficiency of parts; the improved device A including a supporting body construction B wherein a reciprocating construction C is mounted in a cooperative relation with respect to the piston D when the device A is assembled upon an air cylinder E or F; the reciprocating construction C having means to cooperate with a valve construction H in order to vent the air pressure from the air cylinder at different intervals thru valved lines K or L for definitely operating the different indicator arms of the gauges M or N, as the case may be.

The United States Interstate Commerce Commission requires that an orifice test be made of locomotive air pumps at intervals of three months. The tests now in vogue are entirely unsatisfactory, which is proved by the fact that locomotive engineers are constantly making complaints that while their air pumps will suit the requirements of the orifice test, yet the air pumps of their compressors will not supply enough air to properly handle the trains safety. Certain rules are also laid down by the makers of locomotive air pumps or compressors, to determine the troubles of the air pump, but in the main they leave the way open for a large amount of guess work as to the location of the trouble. With the improved device herein described, the efficiency of the pump can be tested, and the trouble determined by reference to what the efficiency of the particular air compressor being tested ought to be.

Referring to the invention, the construction B includes a main body portion 20, comprising a short tubular nipple having a passageway 21 therethrough, and at its upper end being externally screw threaded at 23 for detachable connection in the internally screw threaded opening 24, which comprises the orifice in the casing or housing 25 of the air pump or cylinder E or F to be tested. The lower end of the body 20 is internally screw threaded at 27 for detachably receiving the screw threaded portion 28 of a guide 30, which extends upwardly thru the passageway 21 and itself is provided with a passageway 33 for snug sliding of the upper push rod portion 35 of the reciprocating construction C. The guide 30 adjacent the screw threaded portion 28 is provided with an annular flange 31 which abuts against the outer end of the body portion 20, and the annular flange 31 is recessed to provide a screw threaded socket 35ᵃ adapted to detachably receive therein the upper externally screw threaded end of a spring barrel 38, which may be held in such position by a lock nut 39.

Referring to the reciprocating construction C, the same includes a cross head 40 including upper and lower portions 41 and 42 held together by a screw threaded pin 44; the upper portion 41 of the cross head 40 having the lower or outer end of the push rod 35 rigidly connected therewith at 45. The cross head 40 is provided with a transverse screw threaded opening 48 therethrough for detachably receiving a headed pin 49, the head of which extends thru an elongated slot 50 provided longitudinally of the barrel 38, and terminating short of the ends of said barrel, so that the head of the pin 49 slides along the slot 50 during reciprocation of the cross head 40, and this head projects beyond the external circumference of the spring barrel 38, to cooperate with valve operating levers 52 and 53 disposed at the ends of travel of the cross head, although positioned externally of the spring barrel 38.

The cross head portion 42 at the end thereof opposite the push rod 35 is provided with a detachable rod 52 which may be considered a part of the push rod 35 since the same is operably removable therewith, and this rod portion 52 extends axially thru the spring barrel 38 in a circumferentially spaced relation with the internal periphery of the passageway of the barrel 38, and slidably extends thru a suitable opening in the spring retaining cap 55 which is detachably mounted on the barrel 38 at the end opposite to the connection thereof with the push rod guide 30 above mentioned. In the spring barrel 38 surrounding the rod 52 is disposed a spring 59 under compression, engaging at one end on the cross head and at its opposite end on the detachable cap 55 and being normally under compression to force the push rod 35 into the chamber of the air cylinder E or F, as the case may be, against the piston D operating therein, when the device A is attached to the air cylinder in the relation described.

At this point it is well to state that the gauge of the device A is adapted to register the air pressure at the limits of movement of the piston D in the cylinder chamber. These pressures will be different at the ends of movement of the piston D, and consequently the gauge M which is used for gauging the pressures in the high pressure air cylinder of a cross compound air compressor should embody a mechanism for operating two indicator arms 60 and 61. This type of gauge may be the conventional duplex air gauge well understood as being used in connection with air brake equipment of locomotives, and the same has two passageways leading thereto for receiving air pressure to operate the arms 60 and 61 to indicate different air pressures, at about the same time. The dial 62 of the gauge M is graduated to any approved degree or number of pounds, and the arms 60 and 61 are both pivoted on the same axis, although independently actuated in a relation well understood in this art, and they are preferably differently colored to contrast them from each other. The casing 65 of the gauge M is detachably connected by suitable bracket 68 to the body portion 20 of the housing construction of the improved device A, as illustrated in the drawings, so that the same faces forwardly when the device A is attached to an air cylinder, for indicating the different air pressures under circumstances to be subsequently described.

An extension 70 is formed on the body portion 20 of the body construction of the improved device, laterally extending to one side, and providing a passageway 71 therein open at both ends thereof, wherein a cylindrical shaped valve seat 72ᵃ is fixed, and wherein a cylindrical shaped valve 73 is slidable in a line parallel with the push rod 35. The valve seat 71 is preferably provided with spaced ports 74 and 75 therein, one above the other, which respectively align with the ducts 76 and 77 leading to the passageway 21 of the body 20 above defined. Due to the fact that the guide 30 is of less diameter than the passageway 21, an annular space is provided between the passageway 21 and the external circumference of the rod guide 30, wherein air enters from the cylinder chamber, and passes into the ducts 76 and 77 and thence thru the ports 74 and 75 to the valve 72. The valve 72 is provided with spaced annular grooves 79 and 80 therein, spaced for a greater distance apart than are the ports 74 and 75, so that only one or the other of said grooves may align with their respective ports 74 or 75. Thus, when the port 75 aligns with the groove 80 the port 74 is closed to the groove 79, as illustrated in Figure 5, and vice versa the condition may occur, as illustrated in Figure 4, where the port 74 aligns with the groove 79, and the port 75 is closed to its groove 80.

Referring now to the connection of the valve with the gauge M or N, as the case may be, tubes or conduits 85 and 86 may be provided, which lead to the gauges M or N, as the case may be, for operating the two indicators thereon, these conduits 85 and 86 having suitable connections at 88 and 89, best illustrated in Figure 6 of the drawings, so that the groove 80 may cooperably align with the port 90 in the connection 88 to permit air to flow from the duct 77 thru the port 75 and thence thru the groove 80 into the duct 90 and into the tube 85. Similarly, the connection 89 has a duct 93 therein with which the groove 79 in the valve 72 may be aligned, but only in event the groove 80 is out of alignment with the port 75 above mentioned and its duct 90, as can readily be understood from Figure 6 of the drawings.

The conduits 85 and 86 respectively lead to suitable ports (not shown) of the gauge M or N, as the case may be, in order that the air pressure in the conduit 85 may operate the indicator arm 60, and the air pressure in the conduit 86 may operate the indicator arm 61.

Referring to the operating means of the valve construction H, the valve 72 has a valve rod 95 connected therewith, and extending downwardly parallel with the push rod 35, at its lower end being supported by a suitable adjustable bracket 96 connected on the barrel 38; and intermediate its ends said valve rod 95 being slidably received within the passageway 97 of a bracket 98 which is also carried by the spring barrel 38, as illustrated in Figure 4 of the drawings. Thus the valve rod and valve are guided for movement in a line parallel with the movement of the reciprocating construction C, as is perfectly obvious.

The bracket arms 96 and 98 may be of any approved construction, as illustrated in Figure 7 of the drawings, and they may each include a split sleeve adjustably held together by a bolt 99 as a means to securely clamp them in the desired position along the spring barrel.

The brackets 96 and 98 respectively support adjustable lever supporting arms 100 and 101, respectively facing towards each other, and including square shanks adjustable in suitable openings 102 transversely provided thru their respective brackets, and these shanks being held in adjusted position by means of set screws 103, best illustrated in Figure 7. The bracket arms 100 and 101 respectively support the pivoted levers 53 and 52, intermediate the ends of said levers; the levers being radially positioned with respect to the spring barrel and being detachably or pivotally supported on pins 107 each with a short end 108 extending at one side of the pivot pin towards the barrel 38, and at their opposite ends having bifurcated extensions 109 which straddle the valve rod 95.

The valve rod 95 is adjustably provided with collars 110 and 111 against which the levers 52 and 53 respectively operate; said collars being held in adjustable relation on the rod 95 by set screws 112; the collar 110 being positioned above the lever 52 and the collar 111 being positioned below the lever 53, so that the bifurcated ends of the levers lie between the collars 110 and 111 to cause a reciprocation of the valve 72 in a relation which will be subsequently described. Between the collar 110 and the bracket 98 is positioned a recoil buffing spring 115, and similarly a recoil buffing spring 116 is positioned between the collar 111 and the bracket 96.

In each of the conduit lines 85 and 86 suitable pressure retarding valves R are positioned, each of which includes a body portion 120 having suitable coupling connections 121 and 122 at opposite ends thereof in the respective conduit in which positioned, and being provided with ducts 124 and 125 for communicating with the passageway of the conduit in which positioned; said ducts 124 and 125 leading into a seat 126 wherein the valve member 127 is positioned to regulate the flow of air pressure to the gauge or to the atmosphere.

The valve member 127 is of preferably the conical type, supported in its seat in any approved manner; the same having a port 130 which may be aligned with the duct 124 during pressure reading, or which may upon a 90° turn of the valve member 127 be aligned with a port 132 in the valve body 120, which leads to the atmosphere as illustrated in Figure 11. The valve member 127 also includes a right angled port 133, which during either of the positions above mentioned for the port 130 is aligned with the port 125, to receive air pressure. Preferably axially in the valve member 127 is a tapered opening 135, which extends in a converging relation from the port 130 to the port 133, and which is provided for the tapered end of a needle valve 138, which is adjustably supported at 139 axially in the valve member 127, as illustrated in Figure 10. Upon adjustment of the needle valve 138, the degree of the opening 135 may be regulated, in order to buff the pressure action from the air cylinder to the indicators of the pressure gauge, and thus preventing destruction to the mechanism in the pressure gauge. The valve member 127 is turned independent of adjustment of the valve 138, by means of a handle 140.

Referring to operation of the improved device, as used on the high pressure air cylinder of a cross compound air compressor, and in which cylinder variable superatmospheric pressures exist during operation of the piston D therein, the housing body construction B is mounted with respect to the air cylinder in the relation illustrated in Figures 2 and 5, and as above described. To effect this assemblage, the rod 35 is pushed downwardly into the spring barrel, to compress the spring 59, to the point where the transverse opening illustrated in Figure 15, on rod 52 is forced beyond the cap 55, and a cotter pin is inserted thru the opening to hold the spring compressed and the reciprocating construction C downwardly in the spring barrel. The housing body 20 is then inserted into the orifice opening 24 and screwed in place, and after which the cotter pin is released and the rod 35 will then abut against the bottom of the piston D, or the rod which connects to said piston, in the relation of parts illustrated in Figure 5, where the top edge 125 of the rod 35 is shown as abutting against the bottom end of the piston rod of the piston D. Upon operation of the compressor, according to present practice, the push rod 35 will be reciprocated with the piston D, since the piston D on the downstroke will force the push rod 35 down and upon the upstroke of the piston the force of the spring 59 expanding will compel the push rod 35 to follow the piston travel, as is perfectly obvious. Assuming the piston D to be coming down, the projecting head of the pin 49 will ride along the slot 50 of the spring barrel, and at the very lowest movement of the piston stroke the headed portion of the pin 49 will pass below the lever end 108 of the lever 53, and immediately thereafter the piston D will elevate and the spring force will cause the head of the pin 49 to ride beneath the projecting end 108 of the lever 53, causing the end 109 of the lever 53 to move downwardly against the collar 111, to pull the piston rod 95 downwardly and the valve 72 therewith, and when the uppermost groove 79 of the valve has aligned with the port 74, the headed end of the pin 49 will slip over the lever 53 and the air pressure between the piston D and the lower end of the cylinder will pass thru the passageway 21 and thru the duct 76, thru the port 74, into the groove 79, thru the opening 93 into the conduit 86, and thence past the retarding valve R in that conduit and into the gauge M where the same will actuate one of the indicator arms, say the indicator arm 60 for indicating the pressure which exists in the high pressure cylinder E at the outermost limit of the stroke of the piston D therein. As the instroke or upstroke of the cylinder piston D continues, the push rod 35 will of course ride therewith, incident to the action of the spring 59, and the head extension of the pin 49 will approach the lever 52 and ride over the cam surface thereof to a point above the end 108 of the lever 52, and the piston D will then be at the innermost or top end of its stroke, and immediately thereafter the piston D commences its outstroke and will engage the end 108 of the lever 52 and force the end 112 of the lever 52 and the collar 110 to move the upwardly against the valve 72 therewith until valve rod 95 and the valve 72 therewith until the groove 80 is aligned with the port 75, and in which case the compressed air on the cylinder E will flow into the duct 77 in the relation above described, and thence thru the port 75, into the groove 80, into the duct 90 and into the conduit 85, and from thence pass the retarding valve R in the line 85, and into the gauge M, where the same actuates the indicator arm 61 to register the pressure existing in the cylinder E at the top of the stroke of the piston D.

From the above it is apparent that the device A is best used to measure the air pressure in the high pressure cylinder E at both the limits of the stroke of the piston in the cylinder.

In order to prevent an eccentric operation of the valve 72 upon its actuation thru the lever 52, a spring retaining arm 130 is carried by the bracket 98, having a notch 131 therein in which the end portion 112 of the lever 52 engages after the lever 53 has been actuated by the head of the extension pin 49, and having an upper notch 132 which receives the portion 112 of the lever 52 after the latter has been operated by the head of the extension pin 40 to align the groove 80 with the port 75 in the relation of parts illustrated in Figure 5 of the drawings.

The form of invention illustrated in Figures 13 and 14 differs from the construction above described in that the same is adapted for use on the low pressure cylinders of air compressors, or on the single stage compressor, in which during the instroke of the piston a partial vacuum is created in the cylinder chamber, so that the cylinder chamber is then under subatmospheric pressure. For this a special gauge N is provided which has indicating hands 140 and 141 thereon, respectively cooperating with the pressure and vacuum dial delineations 142 and 143, as clearly shown in Figure 14 of the drawings, it being understood that upon the up or instroke of the piston illustrated in Figure 13, the parts will operate as above described for causing the partial vacuum to be extended thru the port 74 and groove 79 and thence thru the conduit 86 thru the gauge N for operating the indicator arm 141 to indicate the extent of the vacuum or subatmospheric pressure in the cylinder, and as the piston D continues its instroke the indicator arm 141 will of course be moved to a position to indicate the maximum of the vacuum in the cylinder at the limit of the intake stroke, and at which point the lug end of the pin 49 will operate the lever 52 to move the valve, and upon the start of the piston D'', on its outward or compression journey, the valve 72 will move to align the groove 80 with the port 75 and transmit the rising air pressure in the cylinder thru the conduit 85 into the gauge N for operating the indicator hand 140 to indicate the extent of superatmospheric air pressure in the low pressure or single stage cylinder.

In event of leaky packing rings, the pump does not make the full stroke on the high pressure side of the cylinder, and of course leaky valves and clogged air passageways as well as clogged strains will show up in the reduction of the pressures on the gauges. The stroke is accurately measured by reason of the riding of the header extension pin 49 along the slot to indicate on the graduations on the exterior of the barrel 38, as illustrated in Figure 2, the effective length of the stroke. If the stroke is not of the desired length, it is readily apparent that the pump is inefficient in producing the full amount of pressure. In so far as the high pressure cylinder operation of the device A is concerned, the gauge will show the number of pounds the pump is receiving and discharging.

Various changes in the shape, size, and arrangement of parts may be made to the forms of invention herein shown and described, without departing from the spirit of the same or the scope of the claims.

I claim:

1. In combination with a cylinder having a piston therein, a gauge, means connecting the gauge with the cylinder for indicating pressures existing in the cylinder, and means operatively following the piston for cutting the gauge into operation at the limits of travel of the piston to determine air pressures existing in the cylinder with respect to the location of the piston in the cylinder.

2. In combination with an air cylinder having an opening thereto and a piston operating in the cylinder, a reciprocating construction, guide means mounted in the opening of said cylinder for guiding reciprocation of the said reciprocating construction, the latter being constructed to follow the piston during its travel in said cylinder, a gauge, and means between the gauge and the reciprocating construction for causing air pressure from the cylinder to operate the gauge at the limits of movement of the piston in said cylinder.

3. In combination with a cylinder having a chamber therein, and a piston traveling in said chamber, means associated with the cylinder and piston to record pressure in the cylinder only at the extreme end of each single stroke of the piston.

4. In combination with a cylinder having a piston therein, and a piston rod connected therewith, means for connection with the cylinder at the opposite side of the piston from the piston rod for cooperation with the piston during normal engine operation to measure the stroke of the piston in the cylinder chamber.

5. In combination with a cylinder having a chamber therein and a piston traveling in said chamber, a pressure gauge including means for independently and simultaneously recording a plurality of pressures, means to connect the pressure gauge with the chamber of the cylinder to transmit pressure to the pressure gauge, valve means for regulating the admission of pressure to one or the other of the indicating means of the pressure gauge, and means connecting the last mentioned valve means with the piston for operation of the valve means to record pressures existing in the cylinder at different locations during the travel of the piston.

6. In combination with a cylinder including a piston operating therein, a guide housing connected with the cylinder, a rod reciprocable in said guide housing, spring means carried by the guide housing for normally urging the rod against the piston in the cylinder, and means associated with the guide housing and the rod for indicating the extent of travel of the rod along the guide housing during piston operation.

7. In combination with a locomotive air compressor including a cylinder having a chamber therein and a piston operating in said chamber, said chamber having an orifice opening therein, a tubular body for detachable connection in the orifice opening, a rod slidable in said body for engagement against the piston in the cylinder, and spring means carried by the body for urging the rod into such engagement with the piston, said body and rod having means thereon to indicate to an observer the extent of travel of the rod with the piston with respect to the body.

8. In combination with a cylinder having a chamber therein, a piston slidable in said chamber, a rod, means mounting the rod to follow with the piston during operation in the cylinder, means associated with the rod to measure the stroke of the piston during travel, gauge means including a plurality of independently operable indicating devices, and means operable by said rod during its travel to valve control pressure from the cylinder chamber to one of the indicating devices of the gauge means at one end of the piston travel and with the other indicating device at the other end of the piston travel.

9. In a device for determining the efficiency of pressures within cylinder chambers and efficiency of pistons operating therein, the combination of a supporting housing, a rod reciprocating in the supporting housing, a valve, and means associated with the valve and with the rod for operating the valve at predetermined limits of movement of the rod in the housing.

10. In a device for determining the efficiency of pressures within cylinder chambers and efficiency of pistons operating therein, the combination of a supporting housing, a rod reciprocating in the supporting housing, a valve, means associated with the valve and with the rod for operating the valve at predetermined limits of movement of the rod in the housing, and a spring forcing the rod in one direction along the housing.

11. In a device for determining the efficiency of pressures within cylinder chambers and efficiency of pistons operating therein, the combination of a supporting housing, a rod reciprocating in the supporting housing, a valve, means associated with the valve and with the rod for operating the valve at predetermined limits of movement of the rod in the housing, and an air pressure gauge including a plurality of independent measuring mechanisms, said valve including means to direct pressure first into one and then into the other of said measuring mechanisms during travel of the rod in its housing.

12. In combination with a high pressure cylinder including a chamber having a piston slidable therein and an opening in said chamber, a body detachable in said opening, a rod, means slidably mounting the rod in said body, a spring normally engaging the body to urge the rod into engagement with said piston, means carried by said rod including an extension, a valve slidably associated with said body, and trip means for moving the valve at the limits of movement of said rod as determined by the piston, said trip means being operated by said extension above mentioned.

13. In combination with an air cylinder having a piston therein, a housing connected with the cylinder having a plurality of ports communicating with the cylinder, means slidable in the housing with the piston travel, a valve, a gauge having a plurality of independently operable indicating mechanisms, said valve upon movement being adapted to communicate one or the other of said ports of the housing with the indicating mechanisms of the gauge, and means associated with said valve and the means which moves with the piston to cause the operation of said valve for transmitting pressures from the cylinder chamber to the air gauge at predetermined positions of the piston travel.

14. In a device of the class described the combination of a supporting body construction having a passageway therethrough, a rod slidable in said passageway having a headed extension projecting thru the body construction, a spring operating on the rod for forcing the same in one direction, a valve slidably carried by the body construction in line parallel with movement of the rod, a valve rod connected with said valve, levers pivotally mounted with respect to the body construction at spaced points therealong, said levers being operated by the headed extension of said rod during the movement of the rod, said levers having connections with the valve rod to move the valve upon movement of the levers.

15. In combination with a cylinder including a piston, a device for measuring the effective stroke of the piston and the pressure within the cylinder comprising means to follow the piston to measure the stroke thereof, an air gauge, means connecting the air gauge with the cylinder to permit air to flow from the cylinder to the air gauge, a valve in said last mentioned means, and means associated with the valve and the means which follows with the piston to measure the stroke thereof in order to valve regulate the admission of air from the cylinder to the gauge.

16. In combination with a low pressure cylinder having a piston slidable therein, a gauge device including indicating means for determining pressure and indicating means for determining the extent of a vacuum, a valve, and means associated with said valve and gauge device and with the piston for valve regulating admission of pressure or suction from the cylinder to the indicating means of said gauge device.

17. In a device for testing superatmospheric or subatmospheric pressures in cylinders the combination of a gauge having a superatmospheric pressure indicating mechanism therein and also a subatmospheric pressure indicating mechanism therein independently operable with respect to the first mentioned indicating mechanism, and means connected with the gauge for operably connecting either the subatmospheric pressure indicating mechanism or the superatmospheric pressure indicating mechanism to a cylinder independent of the other in an operative relation.

JAMES W. HANNAN.